G. MIDBOE.
DRIVE FOR MOTOR VEHICLES.
APPLICATION FILED APR. 4, 1919.
1,372,627.
Patented Mar. 22, 1921.
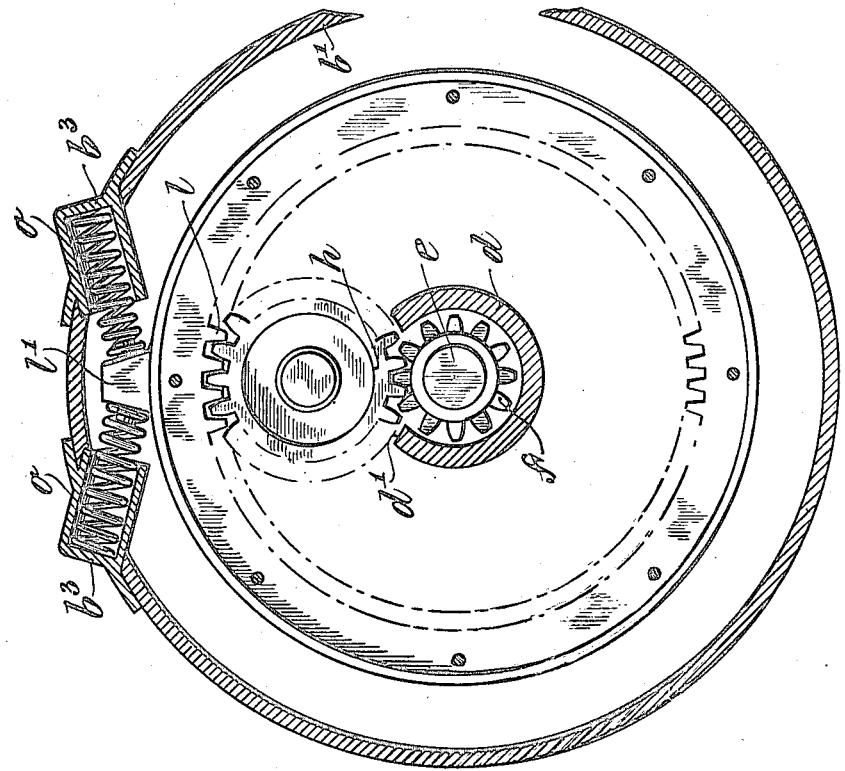
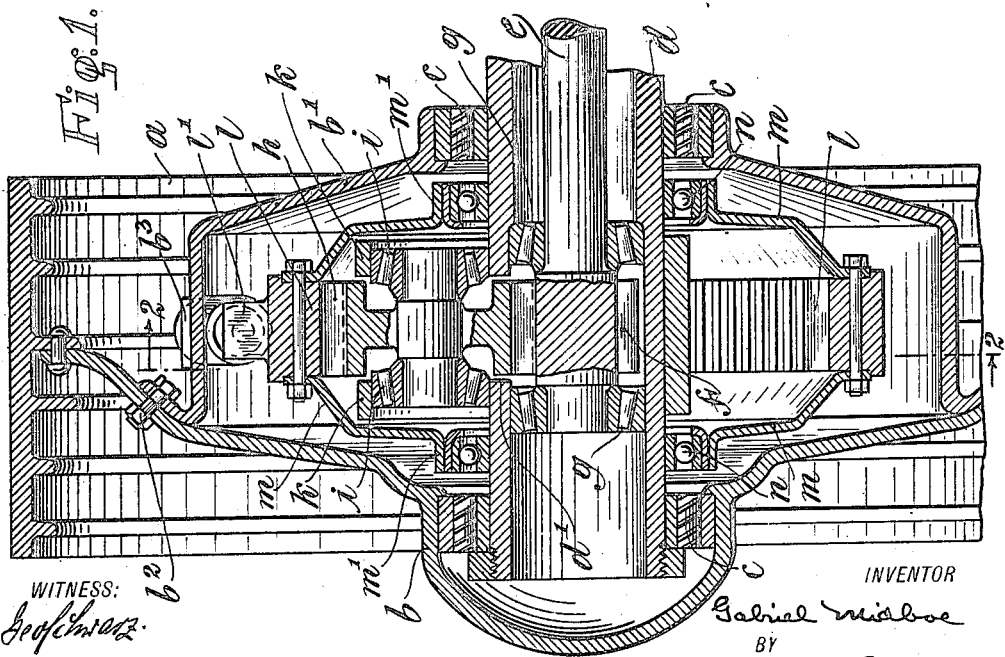
WITNESS:
INVENTOR
BY
ATTORNEYS

UNITED STATES PATENT OFFICE.

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE.

DRIVE FOR MOTOR-VEHICLES.

1,372,627.    Specification of Letters Patent.    Patented Mar. 22, 1921.

Application filed April 4, 1919. Serial No. 287,563.

*To all whom it may concern:*

Be it known that I, GABRIEL MIDBOE, a citizen of the United States, residing in the borough of Brooklyn of the city of New York, in the State of New York, have invented certain new and useful Improvements in Drives for Motor-Vehicles, of which the following is a specification, reference being had to the accompanying drawings, forming a part hereof.

This invention relates to an improved drive for motor vehicles in which the power is transmitted through a live axle shaft and impressed on the wheel. The principal object is to provide such driving mechanism in which the gearing shall be mounted on a dead axle independent of the wheel so that the road shocks will not be transferred from the wheel to the gearing. Another object of the invention is to mount the driving gearing substantially within the plane of the tread of the wheel. The details of construction by which the above objects are realized will appear in connection with the description of the illustrated embodiment shown in the drawings, in which—

Figure 1 is a fragmentary view in vertical section of so much of a wheel as is necessary for an understanding of the application of the improved driving mechanism thereto.

Fig. 2 is a view in transverse section showing the relation of the various gears to the wheel web.

The rim $a$ of the wheel has fastened or riveted thereto a two-part web $b$, $b'$ which serves to support the wheel through bearings $c$ on the dead axle $d$. One of the sections $b'$ is attached to the inner face of the section $b$ as by means of bolts $b^2$ and is so formed as to constitute a circular housing within which the driving mechanism may be disposed. The live axle section $e$ which is of the full floating type extends concentrically through the tubular dead axle $d$ and carries at its end a driving pinion $f$, this pinion with the axle section $e$ being supported on suitable roller bearings $g$ mounted within the dead axle $d$. In the plane of the pinion $f$, but outside of the dead axle $d$ is mounted an idler gear $h$ carried on roller bearings $i$ supported within a suitable carrier $k$ secured to the dead axle $d$. The axle $d$ is slotted as at $d'$ to permit the engagement of the idler gear $h$ with the driving pinion $f$. The idler gear $h$ meshes with an internal gear $l$ to which are bolted circular supporting webs $m$ which, with the gear $l$, inclose the idler $h$ and its associated parts. The webs $m$ have central openings through which the dead axle $d$ extends and are flanged as at $m'$ to receive suitable bearings $n$ which run on raceways carried by the axle $d$. The internal gear $l$ has formed on its periphery a lug $l'$ on the opposite faces of which seat spiral springs $o$ carried in cups $b^3$ secured to the web $b'$ of the wheel.

From the description given it appears that the wheel is mounted on the dead axle $d$ by means of bearings $c$ which are wholly independent of the supporting bearings for the driving mechanism, although this driving mechanism is also supported on the dead axle. The power from the live axle $e$ is transmitted from the pinion $f$ through the idler $h$ to the internal gear $l$, and all of these gears are disposed substantially within the plane of the tread of the wheel, thereby eliminating any twisting strains in the transmission of power to the tread. The driving effort from the internal gear $l$ is imposed on the wheel through one of the springs $o$, this spring serving to absorb the initial torque reaction on starting and to compensate for road shocks which ordinarily would be impressed on the driving mechanism by the wheel. Not only are road shocks compensated for at this point, but they are entirely eliminated at other points by reason of the independent mounting of the wheel and the driving mechanism. The construction illustrated, in addition to the advantages noted, is one which is compact and yet readily accessible and insures complete protection of the inclosed parts from dust and other foreign matter.

Changes in details may be made without departing from the spirit of the invention provided the combinations set out in the appended claims are employed.

I claim as my invention:

1. In combination with the wheel of a motor vehicle, a tubular dead axle on which the wheel is mounted, a drive shaft extending within the dead axle, a pinion on the drive shaft journaled within the tubular axle, a rotatable internal gear independent of the wheel and yieldably connected thereto, said internal gear being concentric to the axle and the said pinion, means rotatable to connect the driving pinion with the internal gear, and bearings for the internal gear carried by the dead axle and independent of the bearings for the wheel.

2. In combination with the wheel of a motor vehicle, a tubular dead axle on which the wheel is mounted, a drive shaft extending within the dead axle, a pinion on the drive shaft journaled within the dead axle, bearings for the drive shaft within the dead axle, a rotatable internal gear without the dead axle and independent of the wheel, said internal gear being concentric to the axle and the said pinion, bearings therefor independent of the wheel bearings, operative connections between the pinion and the gear, and a yieldable connection between the gear and the wheel.

3. In combination with the wheel of a motor vehicle, a tubular dead axle on which the wheel is mounted, a drive shaft extending within the dead axle, a pinion on the drive shaft journaled within the dead axle disposed substantially in the plane of the tread of the wheel, bearings for the drive shaft within the dead axle, a rotatable internal gear without the dead axle disposed substantially in the plane of the tread of the wheel and independent thereof, said internal gear being concentric to the axle and the said pinion, bearings for the gear independent of the wheel bearings, operative connections between the pinion and the gear, and a yieldable connection between the gear and the wheel.

4. In combination with the wheel of a motor vehicle, a tubular dead axle on which the wheel is mounted, a drive shaft extending within the dead axle, a pinion on the drive shaft journaled within the dead axle, bearings for the drive shaft within the dead axle, a rotatable internal gear without the dead axle and independent of the wheel, said internal gear being concentric to the axle and the said pinion, bearings therefor on the dead axle independent of the wheel bearings, an idler gear without the dead axle in mesh with the pinion and the internal gear, bearings therefor independent of the wheel bearings, and a yieldable connection between the internal gear and the wheel.

5. In combination with the wheel and dead axle of a motor vehicle, a hub for the wheel composed of two webs, one of which is formed as a circular housing, wheel bearings on which the webs are supported on the dead axle, driving mechanism disposed within the housing, bearings for the driving mechanism carried by the dead axle and independent of the wheel bearings, and a yieldable driving connection between the driving mechanism and the housing.

6. In combination with the wheel and dead axle of a motor vehicle, a hub for the wheel composed of two webs, one of which is formed as a circular housing, wheel bearings on which the webs are supported on the dead axle, a drive shaft extending within the dead axle, a drive pinion on the shaft, an internal gear within the housing, an idler gear interposed between the pinion and the internal gear, circular webs secured to the internal gear for supporting it on the axle independent of the wheel and constituting a casing to inclose the idler gear, and a yieldable driving connection between the internal gear and the housing.

This specification signed this 1st day of April, A. D. 1919.

GABRIEL MIDBOE.